(No Model.)
J. A. GOEBLER.
BICYCLE PEDAL.
No. 539,865. Patented May 28, 1895.
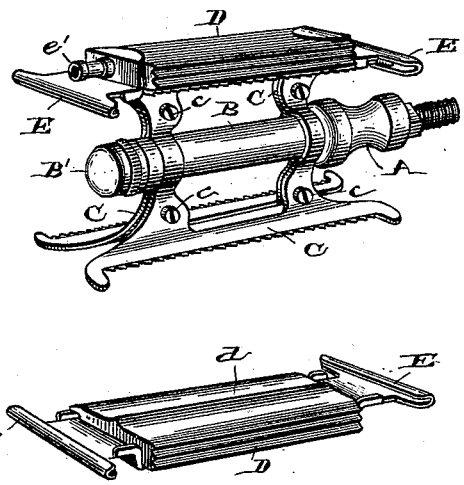
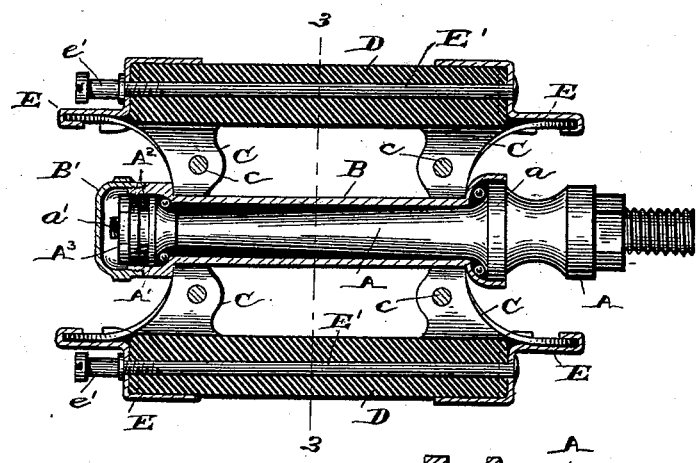
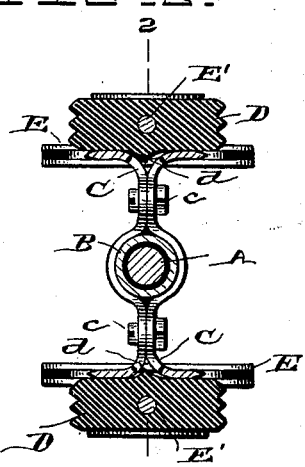
Witnesses
H. F. Nealy
J. A. Walsh
Inventor
John A. Goebler,
By Chester Bradford, Attorney

United States Patent Office.

JOHN A. GOEBLER, OF INDIANAPOLIS, INDIANA, ASSIGNOR TO THE INDIANA BICYCLE COMPANY, OF SAME PLACE.

BICYCLE-PEDAL.

SPECIFICATION forming part of Letters Patent No. 539,865, dated May 28, 1895.

Application filed September 7, 1894. Serial No. 522,392. (No model.)

*To all whom it may concern:*

Be it known that I, JOHN A. GOEBLER, a citizen of the United States, residing at Indianapolis, in the county of Marion and State of Indiana, have invented certain new and useful Improvements in Bicycle-Pedals, of which the following is a specification.

My said invention relates to that class of devices known as pedals for bicycles; and it consists in certain improvements tending to simplicity and inexpensiveness of construction, and also in certain means whereby it may be transformed at will into either a light racing (or what is known as a "rat-trap") pedal, or an ordinary pedal having rubber foot-contact pieces, all as will be hereinafter more particularly described and claimed.

Referring to the accompanying drawings, which are made a part hereof, and on which similar letters of reference indicate similar parts, Figure 1 is a perspective view of a pedal embodying my said invention, showing the rubber foot-pieces attached thereto on one side and detached therefrom on the other, thus illustrating both conditions; Fig. 2, a longitudinal sectional view on the dotted line 2 2 in Fig. 3; Fig. 3, a transverse sectional view on the dotted line 3 3 in Fig. 2; Fig. 4, a detail sectional view, and Fig. 5 a plan view, of the washer.

In said drawings the portions marked A represent the pedal-pin; B, the pedal-pin sleeve; C, the arms or wings or pedal sides; D the pedal rubbers, and E clamps for holding said rubbers in place.

The pedal-pin A is or may be of any ordinary or desired form, and is attached to the pedal crank (not shown) of a bicycle, in a usual or any desired manner. It enters a longitudinal perforation in the pedal-pin sleeve B, and is so formed, at a point just within said pedal-pin sleeve, that its surface forms one side of the ball race at that point, and at the other end it is shouldered and screw-threaded and bears a collar $A'$ which forms one side of the ball race at that end. Outside of said collar the washer $A^2$ and jam nut $A^3$ are placed, by which said collar is held rigidly in place. The sides of the screw-threaded end $a'$ of said pedal-pin are flattened, and the sides of the perforation in the washer $A^2$ are correspondingly flattened, so that no revolution thereof is possible, and thus the collar is effectually prevented from working backward. The pedal-pin does not come in contact with the pedal-pin sleeve at any point, but only in contact with the interposed balls running in the two ball races, and thus the utmost freedom of motion is secured.

The pedal-pin sleeve B surrounds the pedal-pin A, and at the ends is formed to constitute the outer sides of the ball races, as shown. A cap $B'$ is provided which covers the outer end of the pedal-pin, and effectually excludes dirt and dust therefrom. At the other end this pedal-pin sleeve extends entirely over the raised portion $a$ (see Fig. 2), and this serves to practically exclude the dirt and dust at that point.

The wings or pedal sides C are preferably struck up out of sheet metal and bent into the form desired, and two of these parts are then turned face to face and clamped upon the pedal-pin sleeve B by the bolts $c$, as shown, and when these parts are so assembled they constitute in themselves the "rat trap" form of pedal, the outer edges being bent outwardly and developed into the serrated foot-contact portions. This is illustrated most plainly at the lower side of Fig. 1. These pieces are uniform in size and construction, and being constructed of a ductile metal,—such as sheet steel,—are very easily produced, and, when united by the simple means described, not only form desirable and inexpensive pedal parts, but also, while strongly and rigidly united to the pedal-pin sleeve when the parts are assembled, may be easily and quickly removed, and if worn out can thus be promptly and inexpensively replaced. A pedal so constructed is also very light, which is a quality much esteemed by expert bicyclists.

The rubbers D are of a suitable size and shape for the purpose, and adapted to fit closely onto the outer surfaces of the pedal sides C. Their inner sides are extended somewhat in the center, at the point marked $d$, and these protruding points extend down between the two parts by which they are supported, as shown, and thus these rubbers are prevented from moving sidewise on their seats, in either direction. The outer or foot-contact edges may be corrugated, as shown or otherwise, or left smooth, as may be desired.

The clamps E are secured to the ends of the rubbers D by means of small bolts E', which extend through said rubbers from end to end, and secure one of these clamps against each end thereof. The nuts e' are placed upon said rods, as shown, and by loosening said nuts the clamps are released from engagement with the outer ends of the pedal-sides C, and these, together with the rubbers D, may be easily removed; and they may be replaced in like manner, and the nuts tightened up, and be thus clamped firmly in place upon the ends of said pedal-sides.

Having thus fully described my said invention, what I claim as new, and desire to secure by Letters Patent, is—

1. The combination, with a light metal bicycle pedal, of supplemental removable and replaceable foot-contact pieces consisting of the rubber portions D, the clamps E, and the clamping rods E' extending through the same longitudinally, substantially as shown and described.

2. The combination, in a bicycle pedal, of the pedal-pin A, a pedal-pin sleeve B thereon, the wings or pedal-sides C composed of two pieces of sheet metal struck up and bent as shown, and secured together and upon the pedal-pin sleeve by bolts c, the rubbers or foot-pieces D, the clamps E secured to the ends of said foot-pieces and adapted to engage with the ends of the pedal-sides C, and clamping bolts whereby said clamps may be drawn tightly into engagement with said pedal-sides, or released from said engagement, substantially as shown and described.

In witness whereof I have hereunto set my hand and seal, at Indianapolis, Indiana, this 31st day of August, A. D. 1894.

JOHN A. GOEBLER. [L. S.]

Witnesses:
F. W. WOOD,
CHESTER BRADFORD.